(12) United States Patent
Niimi et al.

(10) Patent No.: US 9,809,731 B2
(45) Date of Patent: Nov. 7, 2017

(54) ADHESIVE RESIN COMPOSITION

(71) Applicant: MITSUBISHI PLASTICS, INC., Chiyoda-ku (JP)

(72) Inventors: Kahoru Niimi, Nagahama (JP); Makoto Inenaga, Nagahama (JP); Junichi Nakamura, Toyohashi (JP); Eri Kawai, Toyohashi (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/038,649

(22) PCT Filed: Nov. 25, 2014

(86) PCT No.: PCT/JP2014/081092
§ 371 (c)(1),
(2) Date: May 23, 2016

(87) PCT Pub. No.: WO2015/080097
PCT Pub. Date: Jun. 4, 2015

(65) Prior Publication Data
US 2016/0298007 A1    Oct. 13, 2016

(30) Foreign Application Priority Data
Nov. 29, 2013  (JP) .................................. 2013-247041

(51) Int. Cl.
| | | |
|---|---|---|
| *C09J 151/00* | (2006.01) | |
| *C09J 7/00* | (2006.01) | |
| *C09J 11/06* | (2006.01) | |
| *C08F 290/04* | (2006.01) | |
| *C09J 4/06* | (2006.01) | |
| *C09J 155/00* | (2006.01) | |

(52) U.S. Cl.
CPC ....... *C09J 151/003* (2013.01); *C08F 290/046* (2013.01); *C09J 4/06* (2013.01); *C09J 7/00* (2013.01); *C09J 11/06* (2013.01); *C09J 151/00* (2013.01); *C09J 155/005* (2013.01)

(58) Field of Classification Search
None
See application file for complete search history.

(56) References Cited

U.S. PATENT DOCUMENTS

| | | | | |
|---|---|---|---|---|
| 5,900,465 A | * | 5/1999 | Nishikawa | ............. C09J 153/00 525/314 |
| 5,981,666 A | * | 11/1999 | Zajaczkowski | ...... C09J 151/003 525/296 |
| 2006/0052563 A1 | | 3/2006 | Nakagawa et al. | |
| 2011/0217542 A1 | | 9/2011 | Moroishi et al. | |
| 2012/0328890 A1 | | 12/2012 | Niimi et al. | |

FOREIGN PATENT DOCUMENTS

| | | |
|---|---|---|
| JP | 1-203412 A | 8/1989 |
| JP | 8-209095 A | 8/1996 |
| JP | 11-158450 A | 6/1999 |
| JP | 2011-219582 A | 11/2011 |
| JP | 4971529 B2 | 7/2012 |
| WO | 99/65963 A1 | 12/1999 |
| WO | 2010/018766 A1 | 2/2010 |
| WO | 2012/032995 A1 | 7/2012 |
| WO | 2012/114921 A1 | 8/2012 |
| WO | 2012/173038 A1 | 12/2012 |
| WO | 2013/031567 A1 | 3/2013 |

OTHER PUBLICATIONS

Miura et al., partial electronic translation of JP 11158450, Jun. 1999.*
International Search Report issued Mar. 10, 2015, in PCT/JP2014/081092 dated Nov. 25, 2014.

* cited by examiner

*Primary Examiner* — Jeffrey Mullis
(74) *Attorney, Agent, or Firm* — Oblon, McClelland, Maier & Neustadt, L.L.P.

(57) ABSTRACT

There is provided a new pressure-sensitive adhesive resin composition that can have adhesiveness to the extent of being peelable in a room temperature condition, has fluidity by hot-melting, and can finally be crosslinked to firmly bond adherends to each other. There is proposed a pressure-sensitive adhesive resin composition comprising 100 parts by mass of an acrylic copolymer (A), 0.5 to 20 parts by mass of a crosslinking agent (B), and 0.1 to 5 parts by mass of a photopolymerization initiator (C), wherein the acrylic copolymer (A) is a graft copolymer having a weight average molecular weight of $5.0 \times 10^4$ to $5.0 \times 10^5$, contains as a trunk component of the graft copolymer a repeating unit derived from a (meth)acrylate, contains as a branch component of the graft copolymer a repeating unit derived from a macromonomer having a number average molecular weight of $5.0 \times 10^2$ or more and less than $6.0 \times 10^3$, and contains the repeating unit derived from the macromonomer in the acrylic copolymer (A) in a proportion in a range of 0.1 to 3 mol %.

20 Claims, No Drawings

1

ADHESIVE RESIN COMPOSITION

TECHNICAL FIELD

The present invention relates to a pressure-sensitive adhesive resin composition obtained using a macromonomer. The present invention particularly relates to a pressure-sensitive adhesive resin composition easy to use when a pressure-sensitive adhesive sheet is formed therefrom.

BACKGROUND ART

A macromonomer is a high molecular weight monomer having a polymerizable functional group. The macromonomer is characterized in that a graft copolymer can be easily synthesized by the copolymerization of the macromonomer with another monomer. When a graft copolymer is synthesized using the macromonomer, resins having different properties can be separately incorporated into a branch component and a trunk component respectively and moreover simply and with good purity. Therefore, various pressure-sensitive adhesive compositions obtained using this type of macromonomer are also proposed in the field of adhesives including pressure-sensitive adhesives.

For example, Patent Literature 1 (Japanese Patent Laid-Open No. 1-203412) discloses, as a resin composition for a pressure-sensitive adhesive having good pressure-sensitive adhesive properties such as tack, adhesive force, and cohesive force, a resin composition for a pressure-sensitive adhesive which comprises a graft copolymer obtained by the radical polymerization of a macromonomer having a number average molecular weight of 1000 to 100000 and a glass transition temperature of −20° C. or less, a radical polymerizable monomer having a hydroxyl group or a carboxyl group, and another monomer and in which the glass transition temperature of a trunk polymer is higher than the glass transition temperature of a branch polymer.

Patent Literature 2 (Japanese Patent Laid-Open No. 8-209095) discloses, as a method for improving durability and removability under high temperature and high humidity conditions, an adhesive obtained using a copolymer (weight average molecular weight 500000 to 2000000) of 0.2 to 3 parts by mass of a (meth)acryloyl group-containing macromonomer having a glass transition temperature of 40° C. or more and a number average molecular weight of 2000 to 20000, 57 to 98.8 parts by mass of an alkyl (meth)acrylate, 1 to 20 parts by mass of a functional group-containing monomer, and 0 to 20 parts by mass of another monomer copolymerizable with at least the alkyl (meth)acrylate.

Patent Literature 3 (Japanese Patent Laid-Open No. 11-158450) discloses, as an optionally pressure-sensitive adhesive composition that can be easily bonded to various adherends, can be cured after bonding to exhibit the same level of adhesive force as an adhesive, and is less likely to cause the overflow of the optionally pressure-sensitive adhesive from cut surfaces and the adhesion of the cut surfaces to each other in cutting processing, a curable optionally pressure-sensitive adhesive composition comprising an acrylic pressure-sensitive adhesive polymer obtained by the copolymerization of an alkyl (meth)acrylate monomer and a macromonomer having a number average molecular weight Mn of 1000 to 200000 and a glass transition point Tg of 30 to 150° C. that accounts for 1 to 30% by mass in all monomer components, a photocationic polymerizable compound, and a photocationic photopolymerization initiator.

Patent Literature 4 (Japanese Patent Laid-Open No. 2011-219582) proposes, as a pressure-sensitive adhesive that has excellent pressure-sensitive adhesiveness even when a high content of a filler is contained in the pressure-sensitive adhesive layer of a pressure-sensitive adhesive tape, and maintains pressure-sensitive adhesiveness even when exposed to high temperature, a pressure-sensitive adhesive containing a (meth)acrylic graft copolymer comprising a (meth)acrylic copolymer as a trunk polymer and comprising a (meth)acrylic macromonomer as a branch polymer, a crosslinking agent, and a filler.

CITATION LIST

Patent Literature

Patent Literature 1: Japanese Patent Laid-Open No. 1-203412
Patent Literature 2: Japanese Patent Laid-Open No. 8-209095
Patent Literature 3: Japanese Patent Laid-Open No. 11-158450
Patent Literature 4: Japanese Patent Laid-Open No. 2011-219582

SUMMARY OF INVENTION

Technical Problem

In the field of image displays mainly including cellular phones and portable terminals, in addition to thinning and precision enhancement, design diversification proceeds, and with this, new problems occur. For example, conventionally, generally, a black concealing portion is printed in a frame shape in the peripheral edge portion of a surface protection panel, but with design diversification, this frame-shaped concealing portion begins to be formed in a color other than black. When the concealing portion is formed in a color other than black, the concealing properties are low in the color other than black, and therefore the height of the concealing portion, that is, the printed portion, tends to be higher than in black. Therefore, the printing height difference portion conformability of being able to conform to a large printing height difference portion and fill every corner is required of a pressure-sensitive adhesive for laminating a constituent part comprising such a printed portion. Especially, when a film is laminated to, for example, a surface protection panel on which a printed portion is formed, via a pressure-sensitive adhesive, strain and deformation occur in the film unless the pressure-sensitive adhesive can conform to the printing height difference portion and fill every corner and the surface of the pressure-sensitive adhesive is smooth. Therefore, fluidity is required of the pressure-sensitive adhesive.

Accordingly, the present invention aims to provide a new pressure-sensitive adhesive resin composition that can have adhesiveness to the extent of being peelable (referred to as "tackiness") in a usual condition, that is, in a room temperature condition, and become fluid when heated to a hot-melt temperature so that it can conform to a height difference portion on a laminated surface and fill every corner, thus finally firmly adhering adherends to each other.

Solution to Problem

The present invention proposes a pressure-sensitive adhesive resin composition comprising 100 parts by mass of an acrylic copolymer (A), 0.5 to 20 parts by mass of a crosslinking agent (B), and 0.1 to 5 parts by mass of a photopolymerization initiator (C), wherein the acrylic copolymer (A) is a graft copolymer having a weight average molecular weight of $5.0 \times 10^4$ to $5.0 \times 10^5$, contains as a trunk component of the graft copolymer a repeating unit derived from a (meth)acrylate, contains as a branch component of the graft copolymer a repeating unit derived from a macromonomer having a number average molecular weight of $5.0 \times 10^2$ or more and less than $6.0 \times 10^3$, and contains the repeating unit derived from the macromonomer in the acrylic copolymer (A) in a proportion in a range of 0.1 to 3 mol %.

Advantageous Effects of Invention

By defining the number average molecular weight of the macromonomer constituting the acrylic copolymer (A) that is a base resin and the proportion of the copolymerization of the macromonomer and further the weight average molecular weight of the acrylic copolymer (A) and the like, the pressure-sensitive adhesive resin composition proposed by the present invention can exhibit adhesiveness to the extent of being peelable (referred to as "tackiness") in a room temperature condition while maintaining sufficient holding power. In addition, by heating the pressure-sensitive adhesive composition to the glass transition temperature of the macromonomer or more, the pressure-sensitive adhesive composition can have fluidity. Finally, by irradiating the pressure-sensitive adhesive resin composition with light, that is, active energy rays, adherends can be firmly bonded to each other.

DESCRIPTION OF EMBODIMENT

Next, the present invention will be described based on an example of an embodiment. However, the present invention is not limited to the embodiment described next.
<Present Pressure-Sensitive Adhesive Resin Composition>

A pressure-sensitive adhesive resin composition according to one example of an embodiment of the present invention is a pressure-sensitive adhesive resin composition containing an acrylic copolymer (A), a crosslinking agent (B), and a photopolymerization initiator (C) (referred to as "the present pressure-sensitive adhesive resin composition").
<Acrylic Copolymer (A)>

The acrylic copolymer (A) is a graft copolymer having a weight average molecular weight of $5.0 \times 10^4$ to $5.0 \times 10^5$, contains as the trunk component of the graft copolymer a repeating unit derived from a (meth)acrylate, and contains as the branch component of the graft copolymer a repeating unit derived from a macromonomer.
(Molecular Weight)

It is important that the weight average molecular weight of the acrylic copolymer (A) is $5.0 \times 10^4$ to $5.0 \times 10^5$.

When the weight average molecular weight of the acrylic copolymer (A) is $5.0 \times 10^4$ or more, durability as a pressure-sensitive adhesive composition can be improved. In addition, when the weight average molecular weight exceeds $5.0 \times 10^5$, it is difficult to heat and melt (hot-melt) the pressure-sensitive adhesive resin composition, for example, at about 80° C. On the other hand, when the weight average molecular weight is $5.0 \times 10^5$ or less, the viscosity of the pressure-sensitive adhesive composition can be in a proper range, and, for example, the coating properties can be improved.

From such a viewpoint, it is important that the weight average molecular weight of the acrylic copolymer (A) is $5.0 \times 10^4$ to $5.0 \times 10^5$, it is preferred that the weight average molecular weight is especially $1.2 \times 10^5$ or more or $4.5 \times 10^5$ or less, and it is more preferred that the weight average molecular weight is especially $1.5 \times 10^5$ or more or $4.0 \times 10^5$ or less.
(Structure)

It is preferred that the acrylic copolymer (A) is a graft copolymer comprising as a trunk component a copolymer component containing a repeating unit derived from a (meth)acrylate, and, on the other hand, comprising as a branch component a macromonomer.
(Trunk Component)

It is preferred that the trunk component of the acrylic copolymer (A) is composed of a copolymer component containing a repeating unit derived from a (meth)acrylate.

It is preferred that the glass transition temperature of the copolymer component constituting the trunk component of the acrylic copolymer (A) is −70 to 0° C. At this time, the glass transition temperature of the copolymer component means a value calculated by the Fox calculation formula from the glass transition temperature and constitution ratio of polymers obtained from homopolymers of the components of the copolymer.

The Fox calculation formula is a calculated value obtained by the following formula and can be obtained using values described in Polymer Hand Book, J. Brandrup, Interscience, 1989.

$$1/(273+Tg) = \Sigma(Wi/(273+Tgi))$$

wherein Wi represents the weight fraction of a monomer i, and Tgi represents the Tg (° C.) of a homopolymer of the monomer i.

The glass transition temperature of the copolymer component constituting the trunk component of the acrylic copolymer (A) influences the flexibility of the present pressure-sensitive adhesive resin composition and the wettability, that is, adhesiveness, of the present pressure-sensitive adhesive resin composition on an adherend in a room temperature condition. Therefore, in order for the present pressure-sensitive adhesive resin composition to have moderate adhesiveness (tackiness) in a room temperature condition, it is preferred that the glass transition temperature is −70° C. to 0° C., and it is particularly preferred that the glass transition temperature is especially −65° C. or more and −5° C. or less, especially −60° C. or more and −10° C. or less.

However, even if the glass transition temperature of the copolymer component is the same temperature, the viscoelasticity can be adjusted by adjusting the molecular weight. For example, by decreasing the molecular weight of the copolymer component, the pressure-sensitive adhesive resin composition can be made more flexible.

Examples of a (meth)acrylate that is a monomer unit constituting the trunk component of the acrylic copolymer (A) can include 2-ethylhexyl acrylate, n-octyl acrylate, isooctyl acrylate, n-butyl acrylate, ethyl acrylate, methyl methacrylate, and methyl acrylate.

In addition, it is preferred that the trunk component of the acrylic copolymer (A) contains a hydrophobic (meth)acrylate and a hydrophilic (meth)acrylate as constituent units. The hydrophobic (meth)acrylate is preferred because the water absorption of the acrylic copolymer (A) can be suppressed, and the electrical characteristics such as relative dielectric constant of the acrylic copolymer (A) can be adjusted.

On the other hand, when the trunk component of the acrylic copolymer (A) is composed of only a hydrophobic monomer, a tendency to wet heat whitening is noted, and therefore it is preferred to also introduce a hydrophilic monomer into the trunk component.

Specific examples of the trunk component of the above acrylic copolymer (A) can include a copolymer component obtained by the random copolymerization of a hydrophobic (meth)acrylate, a hydrophilic (meth)acrylate, and a polymerizable functional group at a terminal of the macromonomer.

Here, examples of the above hydrophobic (meth)acrylate include methyl (meth)acrylate, ethyl (meth)acrylate, n-butyl (meth)acrylate, isobutyl (meth)acrylate, sec-butyl (meth)acrylate, t-butyl (meth)acrylate, isopropyl (meth)acrylate, propyl (meth)acrylate, pentyl (meth)acrylate, isopentyl (meth)acrylate, neopentyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, stearyl (meth)acrylate, cetyl (meth)acrylate, and behenyl (meth)acrylate.

Other examples can include (meth)acrylates having aliphatic cyclic structures such as isobornyl (meth)acrylate, cyclohexyl (meth)acrylate, 3,5,5-trimethylcyclohexane (meth)acrylate, dicyclopentanyl (meth)acrylate, dicyclopentenyl (meth)acrylate, dicyclopentenyloxyethyl (meth)acrylate, terpene acrylates and derivatives thereof, and hydrogenated rosin acrylates and derivatives thereof, and styrene.

Especially, monomers having long chain alkyl group structures such as 2-ethylhexyl (meth)acrylate, dodecyl (meth)acrylate, and stearyl (meth)acrylate, and monomers having cyclic structures can be effectively used when the relative dielectric constant of the acrylic copolymer (A) is adjusted.

Examples of the above hydrophilic (meth)acrylate can include hydroxyl group-containing (meth)acrylates such as 2-hydroxyethyl (meth)acrylate, 2-hydroxypropyl (meth)acrylate, 4-hydroxybutyl (meth)acrylate, and glycerol (meth)acrylate, carboxyl group-containing monomers such as (meth)acrylic acid, 2-(meth)acryloyloxyethylhexahydrophthalic acid, 2-(meth)acryloyloxypropylhexahydrophthalic acid, 2-(meth)acryloyloxyethylphthalic acid, 2-(meth)acryloyloxypropylphthalic acid, 2-(meth)acryloyloxyethylmaleic acid, 2-(meth)acryloyloxypropylmaleic acid, 2-(meth)acryloyloxyethylsuccinic acid, 2-(meth)acryloyloxypropylsuccinic acid, crotonic acid, fumaric acid, maleic acid, itaconic acid, monomethyl maleate, and monomethyl itaconate, amino group-containing (meth)acrylate-based monomers such as dimethylaminoethyl (meth)acrylate and diethylaminoethyl (meth)acrylate, monomers containing amide groups such as (meth)acrylamide, N-t-butyl(meth)acrylamide, N-methylol(meth)acrylamide, N-methoxymethyl(meth)acrylamide, N-butoxymethyl (meth)acrylamide, diacetone acrylamide, maleic acid amide, and maleimide, and heterocyclic basic monomers such as vinylpyrrolidone, vinylpyridine, and vinylcarbazole. Other examples can include monomers having cyclic ether structures such as tetrahydrofurfuryl (meth)acrylate and (meth)acryloylmorpholine, and alkoxyalkyl (meth)acrylate esters such as methoxyethyl (meth)acrylate and ethoxyethyl (meth)acrylate.

(Branch Component)

It is important to introduce a macromonomer into the acrylic copolymer (A) as the branch component of the graft copolymer.

The macromonomer means a high molecular weight monomer having a polymerizable functional group at a terminal. The number average molecular weight of the macromonomer in the present pressure-sensitive adhesive resin composition is $5.0 \times 10^2$ or more and less than $6.0 \times 10^3$.

When the number average molecular weight of the macromonomer introduced as the branch component of the acrylic copolymer (A) is $5.0 \times 10^2$ or more, the cohesive force effect of the macromonomer can be obtained. In addition, when the number average molecular weight of the macromonomer is less than $6.0 \times 10^3$, proper viscosity can be set while the pressure-sensitive adhesive properties are maintained. Thus, when the number average molecular weight of the macromonomer is in the above range, sufficient holding power can be maintained in a room temperature condition, and fluidity can be obtained by heating.

From such a viewpoint, it is preferred that the number average molecular weight of the macromonomer is $5.0 \times 10^2$ or more and less than $6.0 \times 10^3$, and it is even more preferred that the number average molecular weight is especially $8.0 \times 10^2$ or more or $5.5 \times 10^3$ or less, especially $1.0 \times 10^3$ or more or $4.5 \times 10^3$ or less.

In addition, it is preferred that the ratio of the number average molecular weight of the above macromonomer to the number average molecular weight of the acrylic copolymer (A) is in the range of 0.0025 to 0.6, and it is further preferred that the ratio is especially 0.005 or more or 0.3 or less, especially 0.008 or more or 0.2 or less, and especially 0.01 or more or 0.1 or less.

In addition, it is preferred that the glass transition temperature (Tg) of the macromonomer is higher than the glass transition temperature of the copolymer component constituting the above acrylic copolymer (A).

Specifically, the glass transition temperature (Tg) of the macromonomer influences the heating and melting temperature (hot-melt temperature) of the present pressure-sensitive adhesive resin composition, and therefore it is preferred that the glass transition temperature (Tg) of the macromonomer is 30° C. to 120° C., and it is further preferred that the glass transition temperature (Tg) is especially 40° C. or more and 110° C. or less, especially 50° C. or more and 100° C. or less.

In the case of such glass transition temperature (Tg), by adjusting the molecular weight, excellent processability and storage stability can be kept, and adjustment can be performed so that the pressure-sensitive adhesive resin composition hot-melts around 80° C.

The glass transition temperature of the macromonomer can be measured by a differential scanning calorimeter (DSC).

In addition, in order to be able to have sufficient holding power as a pressure-sensitive adhesive composition in a room temperature condition and obtain good fluidity when heating to moderate temperature as described above, it is also important to adjust macromonomer content.

From such a viewpoint, it is important that the repeating unit derived from the macromonomer is contained in the acrylic copolymer (A) in a proportion in the range of 0.1 mol % to 3 mol %, and it is preferred that the repeating unit derived from the macromonomer is especially 0.2 mol % or more or 2.5 mol % or less, especially 0.3 mol % or more or 2 mol % or less.

(Component Constituting Macromonomer)

Examples of components constituting the above macromonomer can include methyl (meth)acrylate, ethyl (meth)acrylate, n-butyl (meth)acrylate, isobutyl (meth)acrylate, sec-butyl (meth)acrylate, t-butyl (meth)acrylate, isopropyl (meth)acrylate, propyl (meth)acrylate, pentyl (meth)acrylate, isopentyl (meth)acrylate, neopentyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)

acrylate, dodecyl (meth)acrylate, stearyl (meth)acrylate, cetyl (meth)acrylate, and behenyl (meth)acrylate. Other examples can include alkoxyalkyl (meth)acrylate esters such as methoxyethyl (meth)acrylate and ethoxyethyl (meth) acrylate, hydroxyl group-containing (meth)acrylates such as 2-hydroxyethyl (meth)acrylate, 2-hydroxypropyl (meth) acrylate, 4-hydroxybutyl (meth)acrylate, and glycerol (meth)acrylate, carboxyl group-containing monomers such as (meth)acrylic acid, 2-(meth)acryloyloxyethylhexahydrophthalic acid, 2-(meth)acryloyloxypropylhexahydrophthalic acid, 2-(meth)acryloyloxyethylphthalic acid, 2-(meth)acryloyloxypropylphthalic acid, 2-(meth)acryloyloxyethylmaleic acid, 2-(meth)acryloyloxypropylmaleic acid, 2-(meth)acryloyloxyethylsuccinic acid, 2-(meth)acryloyloxypropylsuccinic acid, crotonic acid, fumaric acid, maleic acid, itaconic acid, monomethyl maleate, and monomethyl itaconate, acid anhydride group-containing monomers such as maleic anhydride and itaconic anhydride, epoxy group-containing monomers such as glycidyl (meth) acrylate, glycidyl α-ethylacrylate, and 3,4-epoxybutyl (meth)acrylate, amino group-containing (meth)acrylate-based monomers such as dimethylaminoethyl (meth)acrylate and diethylaminoethyl (meth)acrylate, monomers containing amide groups such as (meth)acrylamide, N-t-butyl (meth)acrylamide, N-methylol(meth)acrylamide, N-methoxymethyl(meth)acrylamide, N-butoxymethyl (meth)acrylamide, diacetone acrylamide, maleic acid amide, and maleimide, heterocyclic basic monomers such as vinylpyrrolidone, vinylpyridine, and vinylcarbazole, vinyl-based monomers such as styrene, vinyltoluene, α-methylstyrene, acrylonitrile, methacrylonitrile, vinyl acetate, and vinyl propionate, terminal-alkoxyallylated polyether monomers such as methoxyethylene glycol allyl ether, methoxypolyethylene glycol allyl ether, methoxypolypropylene glycol allyl ether, butoxypolyethylene glycol allyl ether, butoxypolypropylene glycol allyl ether, methoxypolyethylene glycol-polypropylene glycol allyl ether, and butoxypolyethylene glycol-polypropylene glycol allyl ether, cyclohexyl (meth)acrylate, t-butylcyclohexyl (meth)acrylate, and isobornyl (meth)acrylate. Especially, it is preferred that the macromonomer does not comprise a carboxyl group-containing monomer.

These may be used alone, or a plurality of these may be copolymerized.

(Polymerizable Functional Group at Terminal)

Examples of terminal polymerizable functional groups of the macromonomer can include a methacryloyl group, an acryloyl group, a vinyl group, and terminal polymerizable functional groups represented by the following structural formula.

[Formula 1]

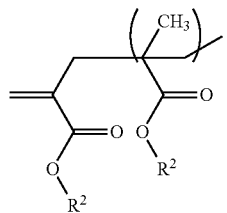

(Method for Producing Macromonomer)

The macromonomer can be produced by known methods. Examples of the methods for producing the macromonomer can include a method where the macromonomer is produced using a cobalt chain transfer agent, a method where an α-substituted unsaturated compound such as an α-methylstyrene dimer is used as a chain transfer agent, a method where a polymerizable group is chemically bonded, and a method by pyrolysis. Among these, as the method for producing the macromonomer, the method where the macromonomer is produced using a cobalt chain transfer agent is preferred in that the number of production steps is small, and a catalyst having a high chain transfer constant is used. The terminal polymerizable functional group of the macromonomer as produced using a cobalt chain transfer agent has a structure represented by the above structural formula 1.

Examples of the method where the macromonomer is produced using a cobalt chain transfer agent include a bulk polymerization method, a solution polymerization method, and aqueous dispersion polymerization methods such as a suspension polymerization method and an emulsion polymerization method.

(Method for Producing Acrylic Copolymer (A))

In the present pressure-sensitive adhesive resin composition, the acrylic copolymer (A) can be obtained by copolymerizing a (meth)acrylate monomer that is the constituent unit of the trunk component, and the above macromonomer.

As the method for producing the acrylic copolymer (A), it is possible to produce the acrylic copolymer (A) from a mixture of one or two or more (meth)acrylate monomers and a separately adjusted macromonomer by known polymerization methods such as a solution polymerization method, a suspension polymerization method, and an emulsion polymerization method. In the present pressure-sensitive adhesive resin composition, because of use as a pressure-sensitive adhesive resin composition, the solution polymerization method is preferred.

In addition to the graft copolymer comprising the trunk component comprising the (meth)acrylate as the constituent unit, and comprising the macromonomer as the branch component, the acrylic copolymer (A) comprises as by-products a block polymer comprising each of the (meth) acrylate and the macromonomer as a constituent unit, and a copolymer obtained by the homopolymerization of the (meth)acrylate, and the like.

In the present invention, assuming that all are produced as graft copolymers, the molecular weight of the acrylic copolymer (A) and the macromonomer content are measured and calculated.

<Crosslinking Agent (B)>

As the crosslinking agent (B), epoxy crosslinking agents, isocyanate crosslinking agents, and crosslinking agents comprising oxetane compounds, silane compounds, acrylic compounds, or the like can be appropriately selected. Especially, polyfunctional (meth)acrylates having two or more (meth)acryloyl groups are preferred in terms of reactivity and the strength of the obtained cured product.

Examples of such polyfunctional (meth)acrylates can include ultraviolet curable polyfunctional monomers such as 1,4-butanediol di(meth)acrylate, glycerin di(meth)acrylate, neopentyl glycol di(meth)acrylate, 1,6-hexanediol di(meth) acrylate, 1,9-nonanediol di(meth)acrylate, tricyclodecane dimethanol di(meth)acrylate, bisphenol A polyethoxy di(meth)acrylate, bisphenol A polypropoxy di(meth)acrylate, bisphenol F polyethoxy di(meth)acrylate, ethylene glycol di(meth)acrylate, trimethylolpropane trioxyethyl (meth) acrylate, ε-caprolactone-modified tris(2-hydroxyethyl) isocyanurate tri(meth)acrylate, pentaerythritol tri(meth) acrylate, propoxylated pentaerythritol tri(meth)acrylate, ethoxylated pentaerythritol tri(meth)acrylate, pentaerythritol tetra(meth)acrylate, propoxylated pentaerythritol tetra(meth)acrylate, ethoxylated pentaerythritol tetra(meth)acrylate, dipentaerythritol hexa(meth)acrylate, polyethylene glycol di(meth)acrylate, tris(acryloxyethyl) isocyanurate, pentaerythritol tetra(meth)acrylate, dipentaerythritol hexa(meth)acrylate, dipentaerythritol penta(meth)acrylate, tripentaerythritol hexa(meth)acrylate, tripentaerythritol penta(meth)acrylate, hydroxypivalic acid neopentyl glycol di(meth)acrylate, a di(meth)acrylate of an ε-caprolactone adduct of hydroxypivalic acid neopentyl glycol, trimethylolpropane tri(meth)acrylate, trimethylolpropane polyethoxy tri(meth)acrylate, and ditrimethylolpropane tetra(meth)acrylate as well as polyfunctional acrylic oligomers such as polyester (meth)acrylates, epoxy (meth)acrylates, urethane (meth)acrylates, and polyether (meth)acrylates.

The crosslinking agent (B) content is not particularly limited. As a standard, it is preferred that the crosslinking agent (B) content is in the proportion of 0.5 to 20 parts by mass, especially 1 part by mass or more or 15 parts by mass or less, and especially 2 parts by mass or more or 10 parts by mass or less based on 100 parts by mass of the acrylic copolymer (A).

By containing the crosslinking agent (B) in the above range, both the shape stability of a pressure-sensitive adhesive sheet in an uncrosslinked state and the foaming resistance reliability in the pressure-sensitive adhesive sheet after crosslinking can be achieved.

<Photopolymerization Initiator (C)>

The photopolymerization initiator (C) serves a function as a reaction initiation aid in a crosslinking reaction with the above-described crosslinking agent (B). Organic peroxides, photopolymerization initiators, and the like that generate radicals with active energy rays as a trigger can be appropriately used. Especially, photopolymerization initiators, particularly photopolymerization initiators sensitive to ultraviolet rays having wavelengths of 380 nm or less, are preferred from the viewpoint of the ease of control of the crosslinking reaction.

Photopolymerization initiators are broadly classified into two types by radical generation mechanism and broadly divided into cleavage type photopolymerization initiators that can generate radicals by the cleavage and decomposition of single bonds in the photopolymerization initiators themselves, and hydrogen abstraction type photopolymerization initiators in which the photoexcited initiator and a hydrogen donor in a system can form an excited complex to transfer hydrogen in the hydrogen donor.

Especially, the cleavage type photopolymerization initiator decomposes into another compound when generating radicals by light irradiation, and does not have a function as a reaction initiator once excited. Therefore, the cleavage type photopolymerization initiator is less likely to remain in a pressure-sensitive adhesive sheet as an active species after a crosslinking reaction is completed, and there is no possibility of causing unexpected light deterioration and the like in the pressure-sensitive adhesive sheet. Therefore, the cleavage type photopolymerization initiator is preferred.

On the other hand, the hydrogen abstraction type photopolymerization initiator is useful in that it does not produce a decomposition product like the cleavage type photopolymerization initiator during a radical generation reaction by irradiation with active energy rays such as ultraviolet rays and therefore is less likely to be a volatile component after the completion of the reaction and can reduce damage to an adherend.

Examples of the above cleavage type photopolymerization initiator can include benzoin butyl ether, benzil dimethyl ketal, 2-hydroxyacetophenone, diphenyl-2,4,6-trimethylbenzoylphosphine oxide, and derivatives thereof.

Examples of the above hydrogen abstraction type photopolymerization initiator can include benzophenone, Michler's ketone, 2-ethylanthraquinone, thioxanthone, and derivatives thereof.

However, the photopolymerization initiator is not limited to the substances mentioned above. In the present pressure-sensitive adhesive resin composition, any one of the cleavage type photopolymerization initiator and the hydrogen abstraction type photopolymerization initiator may be used, or both may be used in combination.

The photopolymerization initiator (C) content is not particularly limited. As a standard, it is preferred that the photopolymerization initiator (C) is contained in the proportion of 0.1 to 5 parts by mass, especially 0.5 parts by mass or more or 5 parts by mass or less, and especially 1 part by mass or more or 3 parts by mass or less based on 100 parts by mass of the acrylic copolymer (A).

By setting the photopolymerization initiator (C) content in the above range, moderate reaction sensitivity to active energy rays can be obtained.

<Other Components (D)>

The present pressure-sensitive adhesive resin composition may contain, as components other than the above, known components blended in a usual pressure-sensitive adhesive composition. For example, various additives such as a tackifying resin, an antioxidant, a light stabilizer, a metal deactivator, an anti-aging agent, a moisture-absorbing agent, a rust preventive, and a hydrolysis inhibitor can also be appropriately contained as needed.

In addition, a reaction catalyst (a tertiary amine-based compound, a quaternary ammonium-based compound, a tin laurate compound, or the like) may be appropriately contained as needed.

<Properties of Present Pressure-Sensitive Adhesive Resin Composition>

In the present pressure-sensitive adhesive resin composition (uncrosslinked state), regarding holding power obtained in accordance with JIS Z 0237, the falling time is preferably 20 minutes or more when the pressure-sensitive adhesive resin composition is shaped into a sheet having a thickness of 150 μm, and the sheet is adhered to a SUS plate with an area of 20 mm×20 mm, and a load of 500 gf is applied in an environment of 40° C.

In the present pressure-sensitive adhesive resin composition, the haze (JIS K7136) is preferably less than 10%, more preferably less than 5%, after a laminated body obtained by shaping the pressure-sensitive adhesive resin composition into a sheet having a thickness of 150 μm to obtain a pressure-sensitive adhesive sheet and sandwiching the pressure-sensitive adhesive sheet between a soda lime glass sheet (thickness 0.5 mm) and a cycloolefin polymer film (thickness 100 μm) is irradiated with ultraviolet rays to cure the pressure-sensitive adhesive sheet.

In addition, in the present pressure-sensitive adhesive resin composition, the haze (JIS K7136) is preferably less than 10%, more preferably less than 5%, after a laminated body obtained by shaping the pressure-sensitive adhesive resin composition into a sheet having a thickness of 150 μm to obtain a pressure-sensitive adhesive sheet and sandwiching the pressure-sensitive adhesive sheet between a soda lime glass sheet (thickness 0.5 mm) and a cycloolefin polymer film (thickness 100 μm) is irradiated with ultraviolet rays to cure the pressure-sensitive adhesive sheet, stored in a moist heat environment of 65° C. and 90% RH for 100 hours, and then stored in a room temperature environment of 23° C. and 50% RH for 2 hours.

<Applications>

The present pressure-sensitive adhesive resin composition is particularly suitable for applications in which the pressure-sensitive adhesive resin composition is formed into sheets and used as a pressure-sensitive adhesive sheet.

A pressure-sensitive adhesive sheet made from the present pressure-sensitive adhesive resin composition in this manner (referred to as "the present pressure-sensitive adhesive sheet") is not only transparent and has adhesiveness, but can conform to a height difference portion on a laminated surface and fill every corner by heating without leaving strain in the pressure-sensitive adhesive sheet, and can further maintain foaming resistance in a high temperature and high humidity environment without impairing workability during handling.

Thus, the present pressure-sensitive adhesive sheet can be preferably used in a flat image display comprising an image display panel such as LCD, PDP, or EL, for example, a personal computer, a mobile terminal (PDA), a game machine, a television (TV), a car navigation system, a touch panel, or a pen tablet, to laminate a transparent panel such as a protection panel or a touch panel or a film part to the image display panel.

For example, in the display screen of a cellular phone, or the like, a configuration in which a surface protection panel is laminated on a functional film such as a touch panel film via a pressure-sensitive adhesive sheet is adopted. At this time, a printed portion for concealment (thickness about 5 µm to 80 µm) is provided in the peripheral edge portion on the back surface of the protection panel, and unless the pressure-sensitive adhesive sufficiently enters the internal corner portions of the height difference portion formed at the edge of the printed portion for concealment, bubbles remain, and the visibility of the screen decreases. In addition, there is a possibility that the film part bends in the vicinity of the height difference portion to cause poor appearance, and foaming or peeling occurs between the laminated parts starting from residual strain due to the bending of the film.

Of course when there is such a height difference portion of about 5 µm to 20 µm, and even if there is a height difference portion of about 50 µm to 80 µm, the present pressure-sensitive adhesive sheet can fill every corner of the height difference portion and be bonded without allowing bubbles to remain. Moreover, even if one of adherends is a film part having bendability, the parts can be laminated and integrated without causing strain and deformation in the film part because the surface can be smoothed without strain by hot-melting the pressure-sensitive adhesive sheet. Moreover, by crosslinking the pressure-sensitive adhesive sheet after lamination, the pressure-sensitive adhesive sheet does not flow and can maintain high cohesive force even in a high temperature environment of, for example, about 85° C., and therefore the pressure-sensitive adhesive sheet has extremely excellent foaming resistance reliability. Therefore, the present pressure-sensitive adhesive sheet can be preferably used when there is an image display-constituting part comprising a height difference portion such as a high printing height difference portion or an uneven portion on a laminated surface, particularly to laminate a part comprising an uneven portion to a bendable film part.

<Description of Phrases>

As used herein, the expression "X to Y" (X and Y are any numbers) also encompasses the meaning "preferably larger than X" or "preferably smaller than Y" together with the meaning "X or more and Y or less" unless otherwise noted.

In addition, the expression "X or more" (X is any number) or "Y or less" (Y is any number) also encompasses the intention of "preferably larger than X" or "preferably less than Y."

EXAMPLES

The pressure-sensitive adhesive resin composition of the present invention will be described in more detail below by giving Examples and Comparative Examples. However, the present invention is not limited to these.

<Synthesis of Macromonomer (a-1)>

900 Parts by mass of deionized water, 60 parts by mass of sodium 2-sulfoethyl methacrylate, 10 parts by mass of potassium methacrylate, and 12 parts by mass of methacrylic acid (MMA) were placed in a polymerization apparatus equipped with a stirrer, a cooling tube, and a thermometer, and stirred, and while nitrogen replacement was performed in the polymerization apparatus, the temperature was increased to 50° C. 0.08 Parts by mass of 2,2'-azobis (2-methylpropionamidine) dihydrochloride as a polymerization initiator was added thereto, and the temperature was further increased to 60° C. After the temperature increase, MMA was continuously dropped at a rate of 0.24 parts by mass/min for 75 minutes using a dropping pump. The reaction solution was kept at 60° C. for 6 hours and then cooled to room temperature to obtain a dispersing agent 1 having a solid content of 10% by mass that was a transparent aqueous solution.

145 Parts by mass of deionized water, 0.1 parts by mass of sodium sulfate, and 0.25 parts by mass of the dispersing agent 1 (solid content 10% by mass) were placed in a polymerization apparatus equipped with a stirrer, a cooling tube, and a thermometer, and stirred to form a uniform aqueous solution. Next, 100 parts by mass of methacrylic acid, 0.004 parts by mass of bis[(difluoroboryl)diphenylglyoximate]cobalt(II) as a chain transfer agent, and 0.4 parts by mass of 1,1,3,3-tetramethylbutyl peroxy2-ethylhexanoate (PEROCTA O, manufactured by NOF CORPORATION) as a polymerization initiator were added to form an aqueous suspension.

Next, nitrogen replacement was performed in the polymerization apparatus, the temperature was increased to 80° C., and the aqueous suspension was reacted for 1 hour. Further, in order to increase the polymerization rate, the temperature was increased to 90° C., and the reaction liquid was kept for 1 hour. Then, the reaction liquid was cooled to 40° C. to obtain an aqueous suspension comprising a polymer. This aqueous suspension was filtered, and the filtered material was washed with deionized water, dewatered, and dried at 40° C. for 16 hours to obtain a macromonomer (a-1). The number average molecular weight of this macromonomer (a-1) was $2.5 \times 10^3$.

<Production of Macromonomers (a-2) and (a-3)>

Macromonomers (a-2) and (a-3) were produced by the same method as the macromonomer (a-1) except that the amounts of the initiator and the chain transfer agent charged were changed to those shown in Table 1.

TABLE 1

|  |  | a-1 | a-2 | a-3 |
|---|---|---|---|---|
| Composition | Methacrylic acid (MMA) | 100 | 100 | 100 |
| Polymerization initiator | 1,1,3,3-Tetramethylbutyl peroxy2-ethylhexanoate (PEROCTA O) | 0.4 | 0.8 | 0.2 |

TABLE 1-continued

|  |  | a-1 | a-2 | a-3 |
|---|---|---|---|---|
| Chain transfer agent | Bis[(difluoroboryl) diphenylglyoximate] cobalt (II) | 0.004 | 0.008 | 0.0017 |
| Number average molecular weight |  | $2.5 \times 10^3$ | $1.4 \times 10^3$ | $5.1 \times 10^3$ |
| Glass transition temperature [° C.] |  | 80 | 55 | 95 |

(Evaluation Methods)

The glass transition temperature of a macromonomer was measured under a nitrogen atmosphere at a temperature increase rate of 5° C./min using a differential scanning calorimeter (manufactured by Rigaku Corporation, DSC SmartRoader). As the standard substance, aluminum oxide was used.

The molecular weight of a macromonomer was measured using gel permeation chromatography (GPC) (HLC-8320 manufactured by Tosoh Corporation). 0.2% By mass of a tetrahydrofuran solution of a (meth)acrylic copolymer (A) was adjusted, and then 10 μl of the above solution was injected into an apparatus equipped with columns (TSKgel SuperHZM-M×HZM-M×HZ2000, TSKguardcolumn SuperHZ-L) manufactured by TOSO. Measurement was performed under the conditions of flow rate: 0.35 ml/min, eluent: tetrahydrofuran (stabilizer BHT), and column temperature: 40° C., and the number average molecular weight (Mn) was calculated in terms of standard polystyrene.

The molecular weight of an acrylic copolymer (A) was measured using gel permeation chromatography (GPC) (HLC-8120 manufactured by Tosoh Corporation). 0.3% By mass of a tetrahydrofuran solution of a (meth)acrylic copolymer (A) was adjusted, and then 20 μl of the above solution was injected into an apparatus equipped with columns (four of TSKgel SuperHM-H, TSKguardcolumn SuperH-H) manufactured by TOSO.

Measurement was performed under the conditions of flow rate: 0.6 ml/min, eluent: tetrahydrofuran (stabilizer BHT), and column temperature: 40° C., and the weight average molecular weight (Mw) and the number average molecular weight (Mn) were calculated in terms of standard polystyrene.

Production Example 1

(Method for Producing Acrylic Copolymer (A))

40 Parts by mass of ethyl acetate, 4.5 parts by mass of isopropanol, and 15 parts by mass of the macromonomer (a-1) were placed in a four-necked flask equipped with a stirring apparatus, a thermometer, a cooling tube, and a nitrogen gas introduction port, and the temperature was increased to 85° C. under a nitrogen gas flow. After 85° C. was reached, a mixture comprising 20 parts by mass of ethyl acetate, 81 parts by mass of n-butyl acrylate, 4 parts by mass of acrylic acid, and 0.04 parts by mass of benzoyl peroxide was dropped over 4.5 hours. After the completion of the dropping, the mixture was kept for 1 hour, and then a mixture comprising 0.5 parts by mass of PEROCTA O and 10 parts by mass of ethyl acetate was added over 1 hour. Then, the mixture was kept for 2 hours, and then 0.5 parts by mass of Irganox 1010 as an antioxidant and 20.5 parts by mass of ethyl acetate were added. Then, the mixture was cooled to room temperature to obtain a methacrylic copolymer (A-1).

The weight average molecular weight and number average molecular weight of the obtained acrylic copolymer (A-1), the glass transition temperature of the copolymer component constituting the trunk component of the acrylic copolymer (A), the number average molecular weight of the macromonomer, the ratio of the number average molecular weight of the macromonomer to the number average molecular weight of the acrylic copolymer (A-1), the glass transition temperature of the macromonomer, and the mol % of the macromonomer in the acrylic copolymer (A-1) are described in Table 2.

Production Example 2

10 Parts by mass of ethyl acetate, 10 parts by mass of the macromonomer (a-2), and 15 parts by mass of 2-ethylhexyl acrylate were placed in a four-necked flask equipped with a stirring apparatus, a thermometer, a cooling tube, and a nitrogen gas introduction port, and the temperature was increased to 85° C. under a nitrogen gas flow. After 85° C. was reached, a mixture comprising 20 parts by mass of ethyl acetate, 75 parts by mass of 2-ethylhexyl acrylate, and 0.04 parts by mass of benzoyl peroxide was dropped over 4.5 hours. After the completion of the dropping, the mixture was kept for 1 hour, and then a mixture comprising 0.5 parts by mass of PEROCTA O and 10 parts by mass of ethyl acetate was added over 1 hour. Then, the mixture was kept for 2 hours, and then 0.5 parts by mass of Irganox 1010 as an antioxidant and 36.7 parts by mass of ethyl acetate were added. Then, the mixture was cooled to room temperature to obtain an acrylic copolymer (A-2).

The properties of the obtained acrylic copolymer (A-2) are described in Table 2.

Production Example 3

40 Parts by mass of ethyl acetate, 12 parts by mass of isopropanol, and 10 parts by mass of the macromonomer (a-3) were placed in a four-necked flask equipped with a stirring apparatus, a thermometer, a cooling tube, and a nitrogen gas introduction port, and the temperature was increased to 85° C. under a nitrogen gas flow. After 85° C. was reached, a mixture comprising 20 parts by mass of ethyl acetate, 90 parts by mass of n-butyl acrylate, and 0.04 parts by mass of benzoyl peroxide was dropped over 4.5 hours. After the completion of the dropping, the mixture was kept for 1 hour, and then a mixture comprising 0.5 parts by mass of PEROCTA O and 10 parts by mass of ethyl acetate was added over 1 hour. Then, the mixture was kept for 2 hours, and then 0.5 parts by mass of Irganox 1010 as an antioxidant and 20 parts by mass of ethyl acetate were added. Then, the mixture was cooled to room temperature to obtain a methacrylic copolymer (A-3).

The properties of the obtained acrylic copolymer (A-3) are described in Table 2.

TABLE 2

| Acrylic copolymer (A) |  | A-1 | A-2 | A-3 |
|---|---|---|---|---|
| Macromonomer (branch portion) | a-1 | 15 | — | — |
|  | a-2 | — | 10 | — |
|  | a-3 | — | — | 10 |
| Other monomers (trunk portion) | nBA | 81 | — | 90 |
|  | 2-EHA | — | 90 | — |
|  | AA | 4 | — | — |
| Tg of trunk polymer [° C.] |  | −40.7 | −55 | −45 |
| Number average molecular weight |  | $3.9 \times 10^4$ | $3.5 \times 10^4$ | $1.7 \times 10^4$ |
| Weight average molecular weight |  | $2.4 \times 10^5$ | $2.9 \times 10^5$ | $9.4 \times 10^4$ |
| Ratio of number average molecular weight of macromonomer to number average molecular weight of acrylic copolymer (A) |  | 0.06 | 0.04 | 0.3 |
| Amount of macromonomer contained in acrylic copolymer (A) [mol %] |  | 0.87 | 1.44 | 0.28 |

Example 1

The acrylic copolymer (A-1) made by Production Example 1 was desolvated to obtain a solid resin.

100 g of trimethylolpropane epoxy acrylate (B-1) as a crosslinking agent (B) and 15 g of diphenyl-2,4,6-trimethylbenzoylphosphine oxide (C-1) as a photopolymerization initiator (C) were uniformly mixed with 1 kg of the solid resin of the acrylic copolymer (A-1) to make a pressure-sensitive adhesive resin composition.

The pressure-sensitive adhesive resin composition was sandwiched between two release-treated polyethylene terephthalate films (each referred to as a "release film"), and using a laminator, the pressure-sensitive adhesive resin composition was shaped into a sheet so as to have a thickness of 150 μm, thereby making a pressure-sensitive adhesive sheet 1.

Example 2

A pressure-sensitive adhesive sheet 2 was made as in Example 1 except that 100 g of glycerin dimethacrylate (B-2) was used as the crosslinking agent (B).

Example 3

The acrylic copolymer (A-2) made by Production Example 2 was desolvated to obtain a solid resin.

50 g of trimethylolpropane PO-modified triacrylate (B-3) as the crosslinking agent (B) and 15 g of a mixture of 2,4,6-trimethylbenzophenone and 4-methylbenzophenone (C-2) as the photopolymerization initiator (C) were uniformly mixed with 1 kg of the solid resin of the acrylic copolymer (A-2) to make a pressure-sensitive adhesive resin composition.

The pressure-sensitive adhesive resin composition was sandwiched between two release-treated polyethylene terephthalate films (each referred to as a "release film"), and using a laminator, the pressure-sensitive adhesive resin composition was shaped into a sheet so as to have a thickness of 150 μm, thereby making a pressure-sensitive adhesive sheet 3 (thickness 150 μm).

Example 4

The acrylic copolymer (A-3) made by Production Example 3 was desolvated to obtain a solid resin.

150 g of pentaerythritol triacrylate (B-4) as the crosslinking agent (B) and 15 g of a mixture of 2,4,6-trimethylbenzophenone and 4-methylbenzophenone (C-2) as the photopolymerization initiator (C) were uniformly mixed with 1 kg of the solid resin of the acrylic copolymer (A-3) to make a pressure-sensitive adhesive resin composition.

The pressure-sensitive adhesive resin composition was sandwiched between two release-treated polyethylene terephthalate films (each referred to as a "release film"), and using a laminator, the pressure-sensitive adhesive resin composition was shaped into a sheet so as to have a thickness of 150 μm, thereby making a pressure-sensitive adhesive sheet 4 (thickness 150 μm).

Comparative Example 1

A transparent double-sided pressure-sensitive adhesive sheet 5 was made using an acrylic copolymer having no macromonomer. In other words, the pressure-sensitive adhesive sheet 5 was made as in Example 1 except that an acrylic copolymer (A-4) (weight average molecular weight: $4.0 \times 10^5$) obtained by the random copolymerization of 20 parts by mass of methyl methacrylate and 80 parts by mass of butyl acrylate was used as the acrylic copolymer (A).

Comparative Example 2

A transparent double-sided pressure-sensitive adhesive sheet 6 was made without blending a crosslinking agent and a photopolymerization initiator.

In other words, only the acrylic copolymer (A-1) used in Example 1 was sandwiched between two release-treated polyethylene terephthalate films (each referred to as a "release film"), and using a laminator, the acrylic copolymer (A-1) was shaped into a sheet so as to have a thickness of 150 μm, thereby making a pressure-sensitive adhesive sheet 6 (thickness 150 μm).

Comparative Example 3

A transparent double-sided pressure-sensitive adhesive sheet 7 was made in accordance with Example 3 in Japanese Patent No. 4971529.

In other words, 50 g of nonanediol diacrylate (B-5) as the crosslinking agent (B) and 10 g of 4-methylbenzophenone (C-3) as the photopolymerization initiator (C) were mixed and added to 1 kg of an acrylic copolymer (A-5) obtained by the random copolymerization of 75 parts by mass of 2-ethylhexyl acrylate, 20 parts by mass of vinyl acetate, and 5 parts by mass of acrylic acid, thereby preparing a pressure-sensitive adhesive resin composition.

The pressure-sensitive adhesive resin composition was sandwiched between two release-treated polyethylene terephthalate films (each referred to as a "release film"), and using a laminator, the pressure-sensitive adhesive resin composition was shaped into a sheet so as to have a thickness of 150 μm, thereby making a transparent double-sided pressure-sensitive adhesive sheet 7 (thickness 150 μm).

[Evaluation]
(Holding Power)

Each of the pressure-sensitive adhesive sheets 1 to 7 having a thickness of 150 μm made in the Examples and the Comparative Examples was cut to 40 mm×50 mm, and the release film on one surface was peeled. The pressure-sensitive adhesive sheet was backlined with a polyethylene terephthalate film for a backing (manufactured by Mitsubishi Plastics, Inc., DIAFOIL S-100, thickness 38 μm) by a hand roller, and then this was cut into a 25 mm wide×100 mm long strip to form a test piece.

Next, the remaining release film was peeled, and the test piece was bonded to a SUS plate (120 mm×50 mm×1.2 mm thick) by a hand roller so that the bonded area was 20 mm×20 mm.

Then, the test piece was aged under an atmosphere of 40° C. for 15 minutes, and then a weight of 500 gf (4.9 N) was attached to and suspended from the test piece in the vertical direction, and the test piece was allowed to stand. Then, the weight falling time (minutes) was measured.

For one in which the weight did not fall within 30 minutes, the length (mm) by which the bonding position between the SUS and the test piece creeped downward, that is, the amount of creep, was measured.

(Total Light Transmittance, Haze)

One release film of each of the pressure-sensitive adhesive sheets 1 to 7 was peeled, and the exposed pressure-sensitive adhesive surface was roll-pressed against a soda lime glass sheet (82 mm×53 mm×0.5 mm thick). Next, the remaining release film was peeled, and a cycloolefin polymer film (manufactured by ZEON Corporation, thickness 100 μm) was laminated by a roll. Then, the resultant laminate was subjected to autoclave treatment (80° C., gauge pressure 0.2 MPa, 20 minutes) for finish-adhesion, and irradiated with ultraviolet rays from the soda lime glass side by a high pressure mercury lamp so that the accumulated amount of light of 365 nm was 2000 mJ/cm$^2$, thereby curing the pressure-sensitive adhesive sheet to make a laminated body for optical characteristic evaluation.

For the above laminated body for optical characteristic evaluation, the haze was measured in accordance with JIS K7136 using a haze meter (manufactured by Nippon Denshoku Industries Co., Ltd., NDH 5000).

(Haze after Storage in Moist Heat Environment)

The above laminated body for optical characteristic evaluation was stored in a moist heat environment of 65° C. and 90% RH for 100 hours and then stored in a room temperature environment of 23° C. and 50% RH for 2 hours, and the haze was measured in accordance with JIS K7136 using a haze meter (manufactured by Nippon Denshoku Industries Co., Ltd., NDH 5000).

(Processing Suitability)

Each of the pressure-sensitive adhesive sheets 1 to 7 was cut into 100 sheets, with the release films laminated, by a 50 mm×80 mm Thomson blade using a Thomson punching machine, and the shapes of the ends were observed. One in which the number of sheets in which the crush of the ends, a paste overflow, or the lifting of the release films was seen was 20 or more was evaluated as "X (poor)," and one in which the number of such sheets was less than 20 was determined as "○ (good)."

(Storage Stability)

A cut article of each of the pressure-sensitive adhesive sheets 1 to 7 made in the above processing suitability evaluation was laminated so as to be sandwiched between 100 mm×100 mm×3 mm thick glass plates, and a weight of 1 kg was placed on the top glass plate. The cut article was allowed to stand at 40° C. for 65 hours.

One in which after the aging, the pressure-sensitive adhesive sheet crushed, and a paste overflow was significantly seen was determined as "X (poor)." One in which a paste overflow was slightly seen but which had no problem in practicality was determined as "○ (good)." One in which no paste overflow was seen was determined as "⊚ (very good)."

(Adhesive Force)

One release film of each of the pressure-sensitive adhesive sheets 1 to 7 was peeled, and a 50 μm polyethylene terephthalate film (manufactured by Mitsubishi Plastics, Inc., DIAFOIL T100, thickness 50 μm) as a backing film was bonded.

The above laminated article was cut to a length of 150 mm and a width of 10 mm, and then the remaining release film was peeled, and the exposed pressure-sensitive adhesive surface was roll-pressed against a soda lime glass sheet. The bonded article was subjected to autoclave treatment (80° C., gauge pressure 0.2 MPa, 20 minutes) for finish-adhesion, and then irradiated with ultraviolet rays so that the accumulated amount of light of 365 nm was 2000 mJ/cm$^2$, thereby curing the pressure-sensitive adhesive sheet. The article was aged at 23° C. and 50% RH for 15 hours to form a peel force measurement sample.

The peel force (N/cm) on the glass when the above peel force measurement sample was peeled in an environment of 23° C. and 40% RH at a peel angle of 180 ° and a peel rate of 60 mm/min was measured.

(Laminating Properties)

One release film of each of the pressure-sensitive adhesive sheets 1 to 7 cut in the processability evaluation was peeled, and the exposed pressure-sensitive adhesive surface was press-laminated (absolute pressure 5 kPa, temperature 80° C., press pressure 0.04 MPa) to the printed surface of a soda lime glass sheet (82 mm×53 mm×0.5 mm thick) in which printing with a thickness of 80 μm was provided in 5 mm of the peripheral edge portion, using a vacuum press so that the four sides of the pressure-sensitive adhesive sheet lay on the printing height difference portion. Next, the remaining release film was peeled, and a cycloolefin polymer film (manufactured by ZEON Corporation, thickness 100 μm) was press-laminated. Then, the press-laminated article was subjected to autoclave treatment (80° C., gauge pressure 0.2 MPa, 20 minutes) for finish-adhesion to make a laminated body.

The laminated body made was visually observed. One in which the pressure-sensitive adhesive sheet did not conform in the vicinity of the printing height difference portion, and bubbles remained was determined as "X (poor)." One in which unevenness and irregularities due to the fact that the film bent and strained in the vicinity of the height difference portion were seen was determined as "Δ (fair)." One which had no bubbles and was smoothly laminated was determined as "○ (good)."

(Foaming Resistance Reliability)

The laminated body made in the laminating property evaluation was irradiated with ultraviolet rays so that the accumulated amount of light of 365 nm was 2000 mJ/cm$^2$, thereby curing the pressure-sensitive adhesive sheet. Then, the laminated body was stored in an environment of 85° C. and 85% RH for 100 hours, and then the appearance was visually observed.

One in which the deformation, foaming, or peeling of the pressure-sensitive adhesive sheet occurred after the environmental test was determined as "X (poor)," and one in which the deformation, foaming, or peeling of the pressure-sensitive adhesive sheet did not occur was determined as "○ (good)."

TABLE 3

|  |  | Example 1 | Example 2 | Example 3 | Example 4 | Comparative Example 1 | Comparative Example 2 | Comparative Example 3 |
|---|---|---|---|---|---|---|---|---|
| Acrylic copolymer (A) | A-1 | 100 | 100 |  |  |  | 100 |  |
|  | A-2 |  |  | 100 |  |  |  |  |
|  | A-3 |  |  |  | 100 |  |  |  |
|  | A-4 |  |  |  |  | 100 |  |  |
|  | A-5 |  |  |  |  |  |  | 100 |
| Crosslinking agent (B) | B-1 | 10 |  |  |  |  |  |  |
|  | B-2 |  | 10 |  |  |  |  |  |
|  | B-3 |  |  | 5 |  |  |  |  |
|  | B-4 |  |  |  | 15 |  |  |  |
|  | B-5 |  |  |  |  |  |  | 5 |

TABLE 3-continued

|  |  | Example 1 | Example 2 | Example 3 | Example 4 | Comparative Example 1 | Comparative Example 2 | Comparative Example 3 |
|---|---|---|---|---|---|---|---|---|
| Photopolymerization initiator (C) | C-1 | 1.5 | 1.5 |  |  | 1.5 |  |  |
|  | C-2 |  |  | 1.5 | 1.5 |  |  |  |
|  | C-3 |  |  |  |  |  |  | 1 |
| Holding power | — | 1.3 mm | 2.0 mm | 3.0 mm | 4.0 mm | 1 min | 0.5 mm | 2 mm |
| Haze (in room temperature environment) | % | 0.4 | 0.4 | 0.4 | 0.4 | 0.3 | 0.4 | 0.3 |
| Haze (in moist heat environment) | % | 0.7 | 0.8 | 4.5 | 4.8 | 18 | 17 | 6.0 |
| Processing suitability | — | ○ | ○ | ○ | ○ | × | ○ | ○ |
| Storage stability | — | ◎ | ◎ | ◎ | ○ | × | ◎ | ◎ |
| Adhesive force | N/cm | 12 | 8 | 4 | 18 | 13 | 7 | 9 |
| Laminating properties | — | ○ | ○ | ○ | ○ | ○ | △ | × |
| Foaming resistance reliability | — | ○ | ○ | ○ | ○ | ○ | × | × |
| Overall evaluation | — | ○ | ○ | ○ | ○ | × | × | × |

[Consideration]

The evaluation results of Examples 1 to 4 and Comparative Examples 1 to 3 are shown in Table 3.

In each of the transparent double-sided pressure-sensitive adhesive sheets of Examples 1 to 4, the macromonomer in the acrylic copolymer contributed as a cohesive component, and as a result, also in an uncrosslinked state, high holding power was exhibited, and the processability and the storage stability were excellent. In addition, high fluidity was exhibited by heating, and therefore not only the conformability to an uneven surface was excellent, but even if one of adherends was a material having low rigidity such as a film, bending was not caused in the vicinity of a height difference portion, and a smooth laminated body was obtained. Further, by forming a laminated body and then irradiating the laminated body with ultraviolet rays to cure the pressure-sensitive adhesive sheet, peeling, foaming, or deforming was not caused under a severe environmental test such as at high temperature and high humidity, and a laminated body having high reliability was obtained.

On the other hand, Comparative Example 1 was a pressure-sensitive adhesive sheet obtained using an acrylic copolymer comprising no macromonomer, and therefore the cohesive force as a pressure-sensitive adhesive was low, and good processability and storage stability were not obtained.

Comparative Example 2 was a sheet formed of only an acrylic copolymer comprising a macromonomer, and good storage stability and cutting processability were obtained. But, when it was stored at high temperature for a long period, it flowed, and therefore a laminated body underwent creep deformation, and the reliability was poor. In addition, no ultraviolet crosslinking agent was contained, and therefore fluidity during lamination was impaired, and as a result, when a laminated body was made, a film bent in the vicinity of a printing height difference portion, resulting in the impairment of the smoothness of the laminated body.

In Comparative Example 3, the pressure-sensitive adhesive resin composition was partially crosslinked by ultraviolet irradiation, and therefore the storage stability and the cutting processability were excellent. But, when glass having a printing height difference portion and a film were laminated, not only unevenness due to the printing height difference portion was transferred to the film side and a smooth laminated body was not obtained, but part of the pressure-sensitive adhesive could not completely fill around corner portions where the printing height difference portion crossed, resulting in the remaining of bubbles. In addition, the growth of bubbles under a high temperature and high humidity test triggered by the strain of the pressure-sensitive adhesive sheet in the vicinity of the height difference portion was seen.

The invention claimed is:

1. A pressure-sensitive adhesive resin composition, comprising:
   (A) 100 parts by mass of an acrylic copolymer (A);
   (B) 0.5 to 20 parts by mass of a crosslinking agent (B); and
   (C) 0.1 to 5 parts by mass of a photopolymerization initiator (C),
   wherein:
   the acrylic copolymer (A) is a graft copolymer having a weight average molecular weight of $5.0 \times 10^4$ to $5.0 \times 10^5$;
   the acrylic copolymer (A) comprises as a trunk component of the graft copolymer a repeating unit derived from a (meth)acrylate;
   the acrylic copolymer (A) comprises as a branch component of the graft copolymer a repeating unit derived from a macromonomer having a number average molecular weight of $5.0 \times 10^2$ or more and less than $6.0 \times 10^3$; and
   the acrylic copolymer (A) comprises the repeating unit derived from the macromonomer in the acrylic copolymer (A) in a proportion in a range of 0.1 to 3 mol %.

2. The pressure-sensitive adhesive resin composition according to claim 1, wherein a ratio of the number average molecular weight of the macromonomer to a number average molecular weight of the acrylic copolymer (A) is in a range of 0.0025 to 0.6.

3. The pressure-sensitive adhesive resin composition according to claim 1, wherein a glass transition temperature of the macromonomer as a branch component of the acrylic copolymer (A) is higher than a glass transition temperature of a copolymer component constituting a trunk component of the acrylic copolymer (A).

4. The pressure-sensitive adhesive resin composition according to claim 1, wherein a glass transition temperature of the macromonomer is 30° C. to 120° C.

5. The pressure-sensitive adhesive resin composition according to claim 1, wherein a glass transition temperature of the graft copolymer constituting the trunk component of the acrylic copolymer (A) is −70 to 0° C.

6. The pressure-sensitive adhesive resin composition according to claim 1, wherein the acrylic copolymer (A) comprises as the trunk component a repeating unit derived from a hydrophobic (meth)acrylate and a hydrophilic (meth)acrylate.

7. The pressure-sensitive adhesive resin composition according to claim 1, wherein the acrylic copolymer (A) has as the trunk component a configuration obtained by random copolymerization of a hydrophobic (meth)acrylate, a hydrophilic (meth)acrylate, and a polymerizable functional group at a terminal of the macromonomer.

8. The pressure-sensitive adhesive resin composition according to claim 1, wherein, when a laminated body is obtained by shaping the pressure-sensitive adhesive resin composition into a sheet having a thickness of 150 μm and sandwiching the pressure-sensitive adhesive sheet between a soda lime glass sheet having a thickness of 0.5 mm and a cycloolefin polymer film having a thickness of 100 μm, and the laminated body is irradiated with ultraviolet rays to cure the pressure-sensitive adhesive sheet, the laminated body has haze of less than 10% in accordance with JIS K7136.

9. The pressure-sensitive adhesive resin composition according to claim 1, wherein, when a laminated body is obtained by shaping the pressure-sensitive adhesive resin composition into a sheet having a thickness of 150 μm and sandwiching the pressure-sensitive adhesive sheet between a soda lime glass sheet having a thickness of 0.5 mm and a cycloolefin polymer film having a thickness of 100 μm, irradiated with ultraviolet rays to cure the pressure-sensitive adhesive sheet, stored in a moist heat environment of 65° C. and 90% RH for 100 hours, and then stored in a room temperature environment of 23° C. and 50% RH for 2 hours, the laminated body has haze of less than 10% in accordance with JIS K7136.

10. The pressure-sensitive adhesive resin composition according to claim 1, wherein, when the pressure-sensitive adhesive resin composition is shaped into a sheet having a thickness of 150 μm, the sheet is adhered to a SUS plate with an area of 20 mm×20 mm, and a load of 500 gf is applied to the sheet in an environment of 40° C., falling time regarding holding power measured in accordance with JIS Z0237 is 20 minutes or more.

11. The pressure-sensitive adhesive resin composition according to claim 1, wherein the photopolymerization initiator (C) is a cleavage type photopolymerization initiator or a hydrogen abstraction type photopolymerization initiator.

12. The pressure-sensitive adhesive resin composition according to claim 2, wherein the photopolymerization initiator (C) is a cleavage type photopolymerization initiator or a hydrogen abstraction type photopolymerization initiator.

13. The pressure-sensitive adhesive resin composition according to claim 1, wherein the graft copolymer has a weight average molecular weight of $1.2 \times 10^5$ to $4.5 \times 10^5$.

14. The pressure-sensitive adhesive resin composition according to claim 1, wherein the repeating unit derived from the macromonomer in the graft copolymer has a number average molecular weight of $8.0 \times 10^2$ to $5.5 \times 10^3$.

15. The pressure-sensitive adhesive resin composition according to claim 1, wherein the acrylic copolymer (A) comprises the repeating unit derived from the macromonomer in the acrylic copolymer (A) in a proportion in a range of 0.2 to 2.5 mol %.

16. The pressure-sensitive adhesive resin composition according to claim 1, wherein 1 to 10 parts by mass of the crosslinking agent (B) is included based on 100 parts by mass of the acrylic copolymer (A).

17. The pressure-sensitive adhesive resin composition according to claim 1, wherein 0.5 to 5 parts by mass of the photopolymerization initiator (C) is included based on 100 parts by mass of the acrylic copolymer (A).

18. The pressure-sensitive adhesive resin composition according to claim 1, wherein a ratio of the number average molecular weight of the macromonomer to a number average molecular weight of the acrylic copolymer (A) is in a range of 0.005 to 0.3.

19. The pressure-sensitive adhesive resin composition according to claim 1, wherein a glass transition temperature of the macromonomer is 40° C. to 110° C.

20. The pressure-sensitive adhesive resin composition according to claim 1, wherein a glass transition temperature of the graft copolymer constituting the trunk component of the acrylic copolymer (A) is −65 to −5° C.

* * * * *